United States Patent [19]

Acharya

[11] Patent Number: 5,447,558

[45] Date of Patent: Sep. 5, 1995

[54] PURIFICATION METHOD AND APPARATUS

[75] Inventor: Divyanshu R. Acharya, Chiddingfold, England

[73] Assignee: The BOC Group plc, Windlesham, England

[21] Appl. No.: 200,788

[22] Filed: Feb. 22, 1994

[30] Foreign Application Priority Data

Feb. 25, 1993 [GB] United Kingdom ............... 9303844

[51] Int. Cl.⁶ .................................................. B01D 53/04
[52] U.S. Cl. ........................................ 95/104; 95/122; 95/139; 96/130; 96/132; 96/144
[58] Field of Search ................................... 95/95–97, 95/106, 117, 118, 122, 139, 104; 96/121, 122, 130–133, 144

[56] References Cited

U.S. PATENT DOCUMENTS

| | | | |
|---|---|---|---|
| 2,340,398 | 2/1944 | Mac Mullin | 95/106 |
| 2,413,771 | 1/1947 | Luáces | 96/130 X |
| 3,102,013 | 8/1963 | Skarstrom | 95/122 X |
| 3,150,942 | 9/1964 | Vasan | 95/122 X |
| 3,710,547 | 1/1973 | Nelson | 95/139 X |
| 3,738,084 | 6/1973 | Simonet et al. | 95/139 X |
| 4,233,038 | 11/1980 | Tao | 95/139 X |
| 4,249,915 | 2/1981 | Sircar et al. | 55/26 |
| 4,472,178 | 9/1984 | Kumar et al. | 95/139 X |
| 4,627,856 | 12/1986 | Von Gemmingon | 95/139 X |
| 4,812,147 | 3/1987 | BeVier | 55/25 |
| 5,071,449 | 12/1991 | Sircar | 95/122 X |
| 5,238,658 | 8/1993 | Makioka et al. | 96/131 X |

FOREIGN PATENT DOCUMENTS

| | | | |
|---|---|---|---|
| 0004465 | 3/1979 | European Pat. Off. . | |
| 0509638 | 10/1992 | European Pat. Off. | 96/121 |
| 1601126 | 9/1970 | France | 95/95 |
| 3045451 | 7/1981 | Germany . | |
| 3413861 | 10/1985 | Germany . | |
| 53-001687 | 1/1978 | Japan | 96/133 |
| 53-053581 | 5/1978 | Japan | 95/106 |
| 55-049144 | 4/1980 | Japan | 95/139 |
| 55-149621 | 11/1980 | Japan | 95/117 |
| 56-037020 | 4/1981 | Japan | 95/139 |
| 59-004414 | 1/1984 | Japan | 95/139 |
| 61-025640 | 2/1986 | Japan | 95/122 |
| 1-155927 | 6/1989 | Japan | 96/130 |
| 2-275707 | 11/1990 | Japan | 95/117 |

*Primary Examiner*—Robert Spitzer
*Attorney, Agent, or Firm*—David M. Rosenblum; Larry R. Cassett

[57] ABSTRACT

Air is purified by being passed in sequence through a first, lower, bed of activated alumina particles which adsorb water vapor preferentially therefrom, and a second, upper, bed of zeolite 13X molecular sieve particles which adsorb carbon dioxide preferentially therefrom. The air passes upwardly through the first bed and downwardly through the second bed. Once fully loaded with the adsorbent components, the beds and are regenerated by the passage therethrough of hot regeneration gas. one part of the regeneration gas flows downwardly through the first bed; another part flows upwardly through the second bed. The hot regeneration gas causes the previously adsorbed components to be desorbed. Once regeneration has ended, and the beds have returned their adsorbing temperature, they may be used again to purify air.

21 Claims, 2 Drawing Sheets

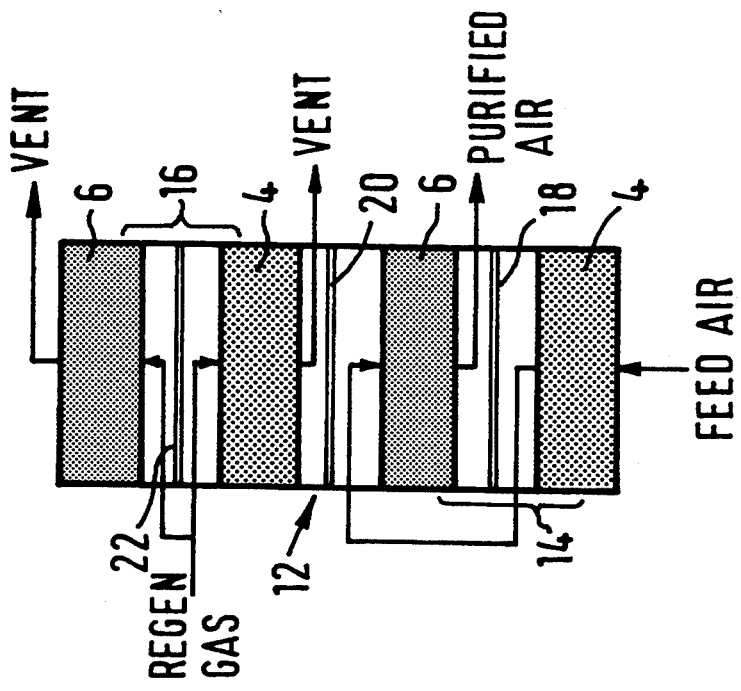
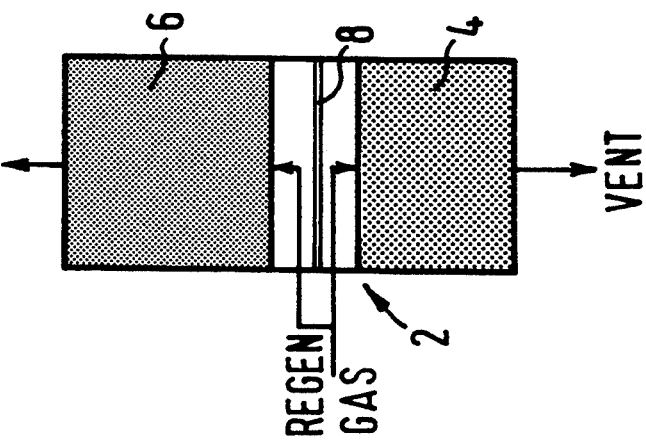
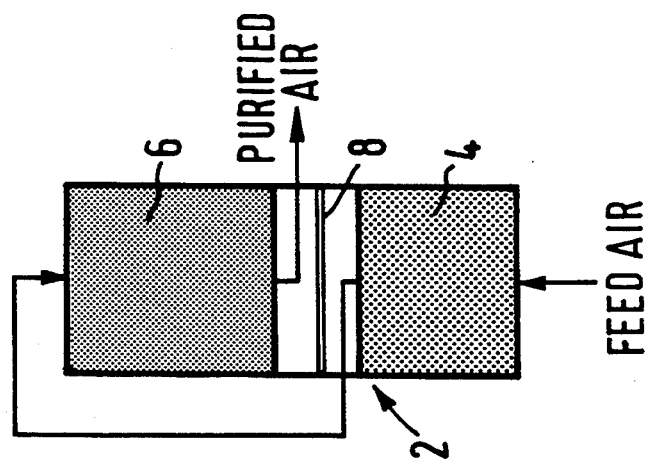

PURIFICATION METHOD AND APPARATUS

BACKGROUND OF THE INVENTION

This invention relates to a method and apparatus for purifying a gas stream containing impurities comprising water vapour and carbon dioxide.

Oxygen and nitrogen are primarily produced commercially by the rectification of air. It is necessary to remove water vapour and carbon dioxide from the air upstream of the rectification. In modern plants for the separation of air by rectification this purification is accomplished by adsorption. An incoming stream of compressed air is passed through a first layer of adsorbent which preferentially adsorbs water vapour and a second layer of adsorbent which preferentially adsorbs carbon dioxide. Typically, while one pair of such layers is being used to purify incoming air, another pair is being regenerated so as to enable there always to be at least one pair of layers available for use in purifying the incoming air.

There is a tendency for air separation plant to be required to meet ever increasing demands oxygen. As a result, the demands placed on the preliminary adsorptive purification step are becoming ever greater.

In practice, there tend for a number of reasons to be limitations on the size of the vessels in which the adsorbent layers can be contained. Accordingly, a large air separation plant typically producing at least 1000 tonnes per day of oxygen may require several adsorption vessels. There is therefore a need to improve adsorption methods so as to enable the productivity of the adsorption process per unit bed volume to be increased.

In a conventional adsorption process for purifying air in which the air flows axially from bottom to top through a first layer of adsorbent particles which preferentially adsorb water vapour and then through a second layer of adsorbent particles which preferentially adsorb carbon dioxide, excessive air velocities will fluidise the adsorbent layers. There is therefore a limit on the air velocity and as a result a limit on the rate at which air can be fed through an adsorbent vessel of a chosen size.

Once the adsorbent layers are fully loaded with adsorbed impurities, regeneration of the layers is conventionally performed by countercurrent passage through the beds of a relatively hot regeneration gas. Since carbon dioxide tends to be less strongly adsorbed than water vapour, inefficiencies are introduced into the regeneration step as a result of the regeneration gas not reaching the adsorbent layer charged with water vapour until it has passed through the layer charged with carbon dioxide. Accordingly, there is a waste of thermal regeneration energy and the overall regeneration time is longer than it might otherwise be.

In U.S. Pat. No. 4,627,856 there is disclosed an improved regeneration step. In the process described in U.S. Pat. No. 4,627,856 there is a lower bed comprising a lower layer of alumina gel and an upper layer of zeolite 13X molecular sieve and an upper bed comprising zeolite 13X molecular sieve. During the adsorption phase, water vapour is adsorbed in the lower layer of the lower bed. Carbon dioxide adsorption is started in the upper layer of the lower bed and completed in the upper bed. Regeneration by means of a hot gas is effected by passing this gas from top to bottom through firstly the upper bed and then through the lower bed. After a chosen period of time when regeneration of the upper bed has been completed, the regeneration gas by-passes this bed and passes directly to the lower bed. A reduction in the regeneration time and savings of thermal energy are achieved. U.S. Pat. No. 4,627,856 does not however address the problem of improving the adsorption phase of the purification process.

SUMMARY OF THE INVENTION

According to the present invention there is provided a method of purifying a feed gas stream containing impurities comprising water vapour and carbon dioxide, comprising repeating in sequence the steps of:

a) passing the feed gas stream in sequence upwardly through a first particulate bed comprising first adsorbent which preferentially adsorbs water vapour therefrom and downwardly through a second particulate bed comprising second adsorbent which preferentially adsorbs carbon dioxide therefrom; and b) passing a regeneration gas through each bed in a direction countercurrent to that of the flow of the feed gas so as to regenerate the beds by causing desorption of previously adsorbed water vapour and carbon dioxide.

The invention also provides apparatus for purifying a feed gas stream comprising, in sequence, a first particulate bed comprising first adsorbent which is able preferentially to adsorb water vapour from the feed gas stream, and a second particulate bed comprising a second adsorbent which is able to adsorb carbon dioxide preferentially from the feed gas stream; and means for causing the feed gas stream to flow upwardly through the first bed and downwardly through the second bed so as to enable the adsorption of water vapour and carbon dioxide to take place; and means for causing a regeneration gas to flow downwardly through the first bed and upwardly through the second bed so as to enable previously adsorbed water vapour and carbon dioxide to be desorbed.

Preferably the first and second beds are housed in the same vessel. If desired, a vessel may house more than one pair of beds, the arrangement being that while one pair of beds is being regenerated, the other is being used to purify feed gas. The beds may be spaced vertically in the vessel and the vessel therefore has a vertical longitudinal axis, or may alternatively be spaced horizontally and the vessel therefore has a horizontal longitudinal axis.

The feed gas is preferably air.

Preferably the first bed has an average particle size greater than that of the second bed. With increasing particle size, higher gas velocities through the first bed may be tolerated. The rate of adsorbing water vapour per unit of volume of first bed increases with increasing gas velocity at constant average particle size. Although the water vapour adsorption capacity per unit volume of the first bed decreases with increasing particle size, this is not a particularly marked effect when the first adsorbent comprises activated alumina. (Alternatively, the first adsorbent may for example comprise silica.) Preferably, the average particle size of the activated alumina is in the range of 0.10 to 0.15 inches.

Preferably, substantially no carbon dioxide is adsorbed in the first bed. Although activated alumina or silica adsorbs water vapour in preference to carbon dioxide, either adsorbent is capable of adsorbing carbon dioxide provided sufficient adsorbent is available.

It is desirable to complete adsorption of water vapour in the first bed.

By arranging for the carrier gas to flow downwards through the second bed, fluidisation of this bed is avoided even if the average particle size in the second bed is such that the gas velocity therethrough would be sufficient to fluidise the second bed were the direction of flow to be upwards. It is therefore advantageous to choose a relatively small average particle size for the second bed. Such a small average particle size also helps to keep down the mass of second adsorbent required to perform a given duty. The choice of a small average particle size for the second adsorbent relative to the first adsorbent is also advantageous in that the pressure drop through the beds is less than it would be were adsorbent of the smaller average particle size to be used throughout. Moreover, it is preferred to employ substantially the same gas velocity through the second bed as through the first bed. A relatively high gas velocity is advantageous since the rate of adsorbing carbon dioxide per unit volume of second bed increases with increasing gas velocity at constant average particle size. Preferably, the second bed comprises zeolite 13X molecular sieve whose average particle size is preferably in the range of 0.050 to 0.075 inches.

Since the second adsorbent is in general relatively easy to regenerate in comparison with the first adsorbent, there is plenty of scope for selecting a regeneration gas velocity through the second bed sufficiently low to avoid its fluidisation during the regeneration step. Choice of a relatively small average particle size for the second bed makes it possible to keep down the volume of second bed needed to perform a given adsorption duty.

By passing the feed gas through the first and second beds at relatively high velocity (in comparison with conventional methods) it is possible to gain one or both the following benefits: first, in comparison with a conventional arrangement of adsorbent beds, the cross-sectional area of both the beds may be reduced thereby making possible a reduction in the size or number of vessels employed; and second, a reduction in the duration of the adsorption step.

Preferably, none of the regeneration gas which passes through the second bed flows through the first bed. Accordingly, separate streams of regeneration gas are preferably used to regenerate the first and second beds, although such separate streams may be taken from the same source of regeneration gas. Accordingly, in comparison with a conventional process, it becomes possible to reduce the duration of the regeneration step since the gas employed to regenerate the first bed does not give up heat at an upstream location to the first bed. In consequence, the number of cycles each comprising an adsorption step and a successive regeneration step that can be performed in a period of say 24 or 48 hours may be increased in comparison with conventional processes using beds of the same size.

Typically, the feed gas is purified at a temperature in the range of 5° to 40° C. and at a pressure in the range of 2 to 20 bar and the regeneration gas has a temperature in the range of 60° to 250° C. The regeneration pressure may be the same as or lower than the adsorption pressure.

BRIEF DESCRIPTION OF THE DRAWINGS

The method and apparatus according to the invention will now be described by way of example with reference to the accompanying drawings, in which:

FIG. 1 is a schematic flow diagram illustrating the adsorption of impurities from air in cylindrical adsorption vessel which has a vertical axis and which houses two separate beds of adsorbent;

FIG. 2 is a schematic flow diagram illustrating the regeneration of the adsorption beds shown in FIG. 1;

FIG. 3 is a schematic flow diagram illustrating the operation of a cylindrical adsorption vessel which has a vertical axis and which houses four separate beds of adsorbent;

In the drawings, like parts are indicated by the same reference numerals.

DETAILED DESCRIPTION OF THE DRAWINGS

Figure 4:
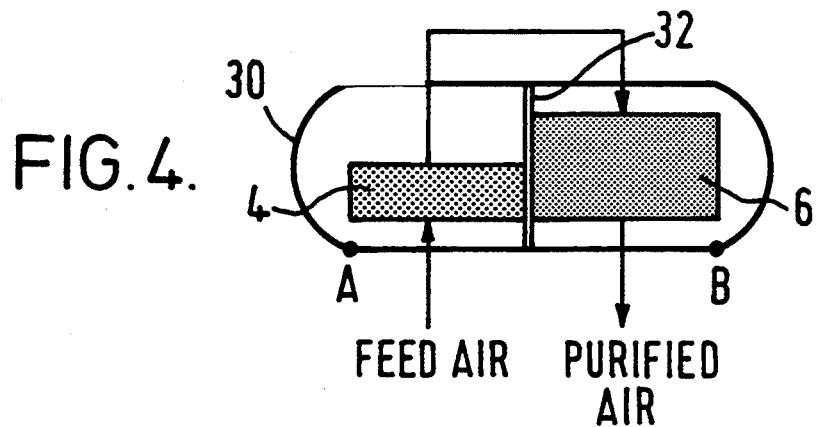
FIG. 4 is a schematic flow diagram illustrating the operation of a cylindrical adsorbent vessel which has a horizontal axis and which houses two separate beds of adsorbent to remove impurities from a feed air stream.

Referring to FIG. 1, a generally cylindrical adsorption vessel 2 houses a first, lower, bed 4 of activated alumina particles 4 and a second, upper, bed 6 of particles of zeolite 13X molecular sieve. The bed 4 has an average particle size of 0.125 inches and the bed 6 has an average particle size of 0.0625 inches. A horizontal partition 8 across the interior of the vessels prevents gas from flowing from the bed 4 through the vessel to the bed 6, or vice versa.

In operation of the apparatus shown in FIG. 1, feed air typically at a pressure in the order of 4 to 15 bar (absolute) and at approximately ambient temperature flows into the bed 4 from the bottom thereof. The air flows upwardly through the bed 4. As it flows upwards so water vapour is adsorbed therefrom in preference to carbon dioxide and the main constituents (oxygen, nitrogen and argon) of the air. Dried air leaves the top of the bed 4 flows out of the vessel 2 and re-enters the vessel 2 at its top. The dried air accordingly flows through the bed 6 from its top to its bottom. The particles of molecular sieve adsorb carbon dioxide from the air. Accordingly, a flow of purified air, from which substantially all its original water vapour and carbon dioxide content has been removed, leaves the bottom of the bed 6 and flows out of the vessel 2 at a pressure a little below the inlet pressure and at a temperature substantially the same as the inlet temperature. If it is desired to separate the air, the purified air flows through at least one heat exchanger (not shown) to cool it to approximately its saturation temperature and the thus cooled air is rectified to form oxygen-rich and nitrogen-rich products.

In time, the bed 4 becomes almost saturated with water vapour and the bed 6 becomes almost saturated with carbon dioxide. The relative depths of the beds 4 and 6 are arranged such that these events happen substantially simultaneously. Just before saturation, communication between the vessel 2 and the feed air is stopped. (A so-called "adsorption front" gradually progresses from the upstream end towards the downstream end of each bed. Adsorption is stopped before the adsorption front reaches the downstream end; otherwise there will be a "break-out" of impurities from the beds.)

The beds 4 and 6 are then regenerated in the manner illustrated in FIG. 2 of the drawings. A stream of regeneration gas typically at a pressure in the range of 1.5 to 5 bar (absolute) and at a temperature in the range of 8° to 250° C. is employed. The regeneration gas is preferably formed by taking a part of the nitrogen-rich gaseous product of rectification and heating it to a desired temperature. The flow of regeneration gas is divided. One part of the regeneration gas is introduced into the vessel 2 into the space between the top of the bed 4 and the partition 8 and flows downwardly through the bed 4. The regeneration gas causes water vapour to be desorbed from the adsorbent particles in the bed 4 and over an extended period of time is able to remove substantially all of the previously adsorbed water vapour. Downflow regeneration of the first bed ensures that should any desorbed water condense, it will not be carried over to the second bed during a subsequent adsorption step.

The second part of the regeneration gas is passed into the vessel 2 at a region between the bottom of the bed 6 and the partition 8. The second part of the regeneration gas therefore flows upwardly through the bed 6 to its top and vents out of the vessel 2. The regeneration gas flowing through the bed 6 is effective to desorb carbon dioxide from the zeolite molecular sieve and over a prolonged period of time all the carbon dioxide adsorbed in the previous adsorption step is desorbed.

Typically, the velocity of flow of the regeneration gas through the second bed 6 is arranged to be less than that through the first bed 4 in order to ensure that there is no fluidisation of the relatively small particles in the bed 6.

In a typical installation for purifying air, there is at least one pair of vessels 2 so as to enable air to be continuously purified. During part of the period in which one vessel is used to adsorb water vapour and carbon dioxide from feed air, the adsorbent beds in the other vessel are regenerated. Thus, once the beds are nearing saturation in the one vessel, the feed air can be switched to the regenerated vessel.

Referring to FIG. 3, there is shown an alternative arrangement in which two pairs 14 and 16 of adsorbent beds are housed in the same generally cylindrical vessel 12. The first pair 14 of beds comprises a lower bed 4 of activated alumina particles and an upper bed 6 of zeolite 13X molecular sieve particles. There is a partition 18 across the vessel 12 preventing gas flow therethrough between the beds 4 and 6 of the lower pair 14 of such beds. In FIG. 3, the lower pair 14 of beds is shown purifying feed air. The operation of the lower pair 14 of beds to purify the air is analogous to the operation of the beds 4 and 6 described hereinabove with reference to FIG. 1.

The upper pair 16 of beds comprises a first, lower, bed 4 of activated alumina particles and a second, upper bed 6 of zeolite 13X molecular sieve particles. A partition 20 prevents gas flowing through the vessel from the bed 6 of the lower pair 14 of beds to the bed 4 of the upper pair 16 and vice versa. A partition 22 prevents flow of gas through the vessel from the first bed 4 of the upper pair to the second bed 6 and vice versa. As shown in FIG. 3, the upper pair 16 of beds is arranged for regeneration. The regeneration is performed in a manner analogous to that described hereinabove with reference to FIG. 2. When the lower pair 14 of beds approaches saturation, the upper pair 16 may be used to adsorb water vapour and a carbon dioxide from feed air and the lower pair 14 regenerated. Accordingly, continuous purification of feed air is possible.

Referring to FIG. 4 of the drawings, there is shown a generally cylindrical vessel 30 disposed with its longitudinal axis extending horizontally. The vessel 30 houses a first bed 4 of activated alumina particles and a second bed 6 of zeolite 13X molecular sieve particles. The beds 4 and 6 separated from one another by a partition 32. The beds 2 and 4 are shown in FIG. 4 in a mode in which feed air is being purified by adsorption of water vapour as the air flows upwards through the bed 4 and by adsorption of carbon dioxide as the air flows downwards through bed 6. The operation of the beds is analogous to that of the beds 4 and 6 described with reference to FIG. 1 of the drawings.

Figure 5:
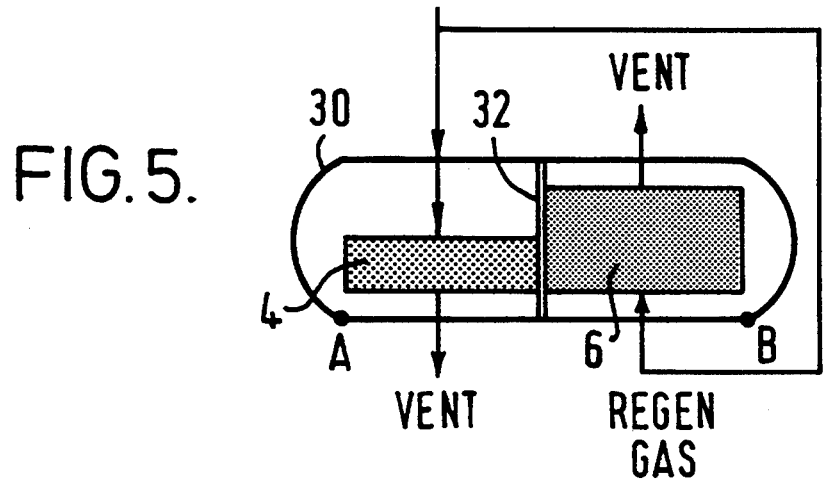
FIG. 5 is a schematic flow diagram illustrating the regeneration of the adsorbent beds shown in FIG. 4.

FIG. 5 illustrates the regeneration of the beds shown in FIG. 4. One stream of regeneration gas flows downwardly through the bed 4 to drive off water vapour; a second stream of regeneration gas flows upwardly through the bed 6 to drive off carbon dioxide. The operation of this regeneration step is analogous to that described hereinabove with reference to FIG. 2 of the drawings.

Figure 6:
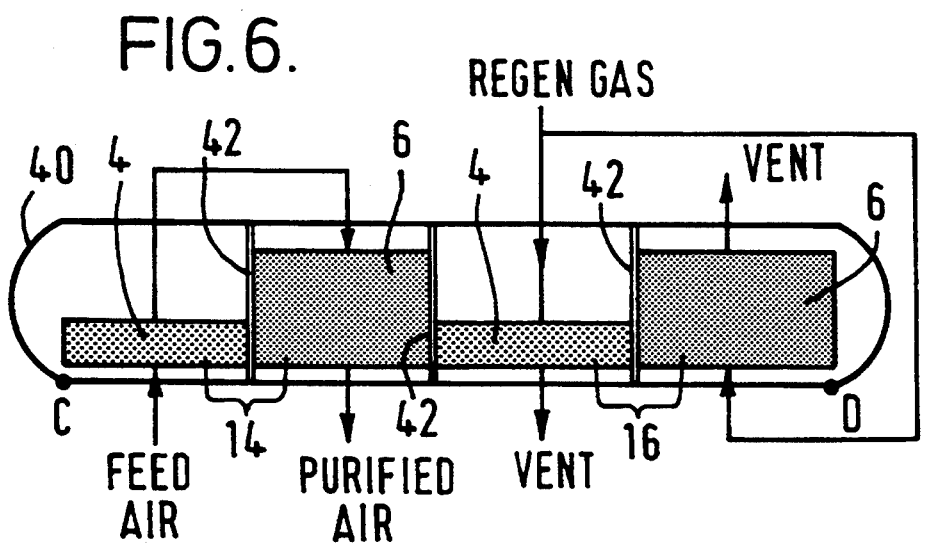
FIG. 6 is a schematic flow diagram illustrating the operation of a cylindrical adsorbent vessel which has a horizontal axis and which contains four separate beds of adsorbent to purify air.

Referring now to FIG. 6, there is shown a generally cylindrical vessel 40 disposed with its longitudinal axis horizontal. The vessel houses a first pair 14 of adsorbent beds 4 and 6 and a second pair 16 of such adsorbent beds. The beds are arranged in a horizontal row with a partition 42 between each bed and an adjacent bed. The vessel 40 is shown in FIG. 6 with the first pair 14 of beds adsorbing water vapour and carbon dioxide impurities from the feed air and the second pair 16 being regenerated. The operation of the apparatus shown in FIG. 6 is thus analogous to that described hereinabove with reference to FIG. 3.

Since the drawings are schematic, and illustrate directions of gas flow, the actual physical construction of the vessels that house the adsorbent beds is not illustrated. The construction of the vessels may however be conventional, employing conventional arrangements of valves, conventional bed support means and conventional gas distribution means. The dimensions of each adsorbent bed may be selected in accordance with conventional design procedures well known in the art, and typically the depth of the first adsorbent bed will be less than that of the second adsorbent bed.

In each of the above described embodiments of adsorption apparatus according to the invention, the bed or beds 4 each have a depth of 0.7 m, a mass of 12 tonnes, and consist of particles of adsorbent in the form of beads of activated alumina having an average size of 0.125 inches (3.175 mm); and the bed or beds 6 each have a depth of 1.7 m, a mass of 22 tonnes, and consist of particles of adsorbent in the form of beads of zeolite 13X molecular sieve having an average size of $8 \times 12$ mesh, that is 1.59 mm. One suitable commercially available form of activated alumina for use in forming the bed or beds 4 is ALCOA F200 activated alumina.

One suitable commercially available form of zeolite 13X molecular sieve for forming the bed or beds 6 is UOP zeolite 13X APG molecular sieve.

The vessel 2 shown in FIGS. 1 and 2 may have a diameter of 5 m, as may the vessel 2 shown in FIG. 3. The vessel 30 shown in FIGS. 4 and 5 may have a length of 9.24 m from end to end of its cylindrical wall (i.e. the distance AB shown in FIGS. 4 and 5) and an internal diameter of 5 m. The vessel 40 shown in FIG. 6 may have a length of 18.5 m from end to end of its cylindrical wall (i.e. the distance CD shown in FIG. 6) and an internal diameter of 5 m.

In an example of the operation of any one of the adsorption vessels described in the paragraph immediately above, a flow of 200,000 standard $m^3$ per hour of air at a pressure of 15 bar absolute and a temperature of 25° C. containing 400 volumes per million of carbon dioxide may be purified to produce a dry gas containing 1 volume per million of carbon dioxide. In a typical cycle of operations the adsorption time is 4 hours. The beds are then reduced in pressure to a chosen regeneration pressure during part of a "changeover" period of 30 minutes in duration. Regeneration is performed using a dry gas essentially free of carbon dioxide at a temperature of 150° C. for an initial period of 1.5 hours. The flow of regeneration gas during this period is from 15 to 20% of the flow rate of incoming air. Typically, 67% of the regeneration gas flow is passed through the activated alumina bed and 33% of such flow through the zeolite bed. The regeneration gas may be nitrogen or purified air. If the latter, the flow of regeneration gas is preferably 15% (i.e. 30,000 $sm^3$/hr) of the feed air. At the end of the initial period of regeneration, the flow of regeneration gas continues at an unchanged rate but by-passes means previously used to heat it. This flow of regeneration gas thus enters the adsorption vessel at about ambient temperature and will thus reduce the temperature of the beds. The flow of ambient temperature regeneration gas continues for two hours. There is then another changeover period of 30 minutes during part of which the beds are repressurised with dry air to the adsorption pressure of 15 bar absolute.

Typically, while one pair of beds is adsorbing impurities, another pair of beds is being regenerated. The changeover period at the end of adsorption in one pair of beds is arranged to coincide with the changeover period at the end of regeneration of the other pair of beds. The coincident changeover periods are arranged such that production of purified air continues throughout. In one arrangement, production of purified air continues in one pair of beds while the other pair is repressurised. The feed air is then split between both pairs of beds and purified air is then produced from both pairs of beds. The repressurised pair is next switched to full production of purified air and the depressurisation of the other pair is carried out simultaneously, being completed at the end of the changeover period.

I claim:

1. A method of purifying a feed gas stream containing impurities comprising water vapour and carbon dioxide, comprising repeating in sequence the steps of:
    a) passing the feed gas stream in sequence upwardly through a first particulate bed comprising first adsorbent which preferentially adsorbs water vapour therefrom and downwardly through a second particulate bed comprising second adsorbent which preferentially adsorbs carbon dioxide therefrom; and
    b) dividing a regeneration gas into two subsidiary streams and passing one of said two subsidiary streams through said first particulate bed and the other of said two subsidiary streams through said second particulate bed in directions countercurrent to that of the flow of the feed gas so as to regenerate the beds by causing desorption of previously adsorbed water vapour and carbon dioxide.

2. The method as claimed in claim 1, in which the first bed has an average particle size greater than that of the second bed.

3. The method as claimed in claim 1, in which the first adsorbent comprises activated alumina.

4. The method as claimed in claim 3, in which the average particle size of the activated alumina is in the range of 0.10 to 0.15 inches.

5. The method as claimed in claim 1, in which no carbon dioxide or less than 10% of the total carbon dioxide is adsorbed in the first bed.

6. The method as claimed in claim 1, in which adsorption of water vapour is completed in the first bed.

7. The method as claimed in claim 1, in which the second bed comprises zeolite 13X molecular sieve.

8. The method as claimed in claim 7, in which the average particle size of the zeolite 13X molecular sieve is in the range of 0.050 to 0.075 inches.

9. The method as claimed in claim 1, in which none of the regeneration gas which passes through the second bed flows through the first bed.

10. The method as claimed in claim 9, in which separate streams of regeneration gas are used to regenerate the first and second beds.

11. The method as claimed in claim 1, in which the feed gas is air.

12. An apparatus for purifying a feed gas stream comprising: sequential first and second particulate beds, said first particulate bed comprising first adsorbent which is able preferentially to adsorb water vapour from the feed gas stream; said second particulate bed comprising a second adsorbent which is able to adsorb carbon dioxide preferentially from the feed gas stream; means for causing the feed gas stream to flow upwardly through the first bed and downwardly through the second bed so as to enable the adsorption of water vapour and carbon dioxide to take place; and means for dividing a regeneration gas into two subsidiary streams and for causing one of said two subsidiary streams to flow downwardly through the first bed and the other of said two subsidiary streams to flow upwardly through the second bed so as to enable previously adsorbed water vapour and carbon dioxide to be desorbed.

13. The apparatus as claimed in claim 12, in which the first and second beds are housed in the same vessel.

14. The apparatus as claimed in claim 13, in which the means for causing a regeneration gas to flow downwardly through the first bed and upwardly through the second bed creates separate flows through the beds with none of the regeneration gas that passes through the second bed flowing through the first bed.

15. The apparatus as claimed in claim 12, in which more than one pair of first and second beds is housed in the same vessel.

16. The apparatus as claimed in claim 12, in which the beds are spaced vertically or horizontally.

17. The apparatus as claimed in any one of claims 12, in which the first bed has an average particle size greater than that of the second bed.

18. The apparatus as claimed in claim 17, in which the first adsorbent comprises activated alumina.

19. The apparatus as claimed in claim 18, in which the average particle size of the activated alumina is in the range of 0.10 to 0.15 inches.

20. The apparatus as claimed in claim 12, in which the second bed comprises zeolite 13X molecular sieve.

21. The apparatus as claimed in claim 20, wherein the average particle size of the zeolite 13X molecular sieve is in the range of 0.050 to 0.075 inches.

* * * * *